US009928745B2

(12) United States Patent
Backof, II et al.

(10) Patent No.: US 9,928,745 B2
(45) Date of Patent: Mar. 27, 2018

(54) SYSTEM AND METHOD FOR PAIRING PASSENGERS AND IN-VEHICLE EQUIPMENT

(71) Applicant: Creative Mobile Technologies, LLC, Long Island City, NY (US)

(72) Inventors: John J. Backof, II, Westchester, PA (US); Mitchell Dinowitz, Dix Hills, NY (US)

(73) Assignee: CREATIVE MOBILE TECHNOLOGIES, LLC, Long Island City, NY (US)

(*) Notice: Subject to any disclaimer, the term of this patent is extended or adjusted under 35 U.S.C. 154(b) by 0 days.

(21) Appl. No.: 14/929,499

(22) Filed: Nov. 2, 2015

(65) Prior Publication Data
US 2016/0155335 A1 Jun. 2, 2016

Related U.S. Application Data

(60) Provisional application No. 62/085,621, filed on Nov. 30, 2014.

(51) Int. Cl.
G08G 1/00 (2006.01)
G01C 21/34 (2006.01)
G06Q 30/04 (2012.01)

(52) U.S. Cl.
CPC ............ G08G 1/20 (2013.01); G01C 21/3438 (2013.01); G06Q 30/04 (2013.01); G08G 1/202 (2013.01); G08G 1/205 (2013.01)

(58) Field of Classification Search
None
See application file for complete search history.

(56) References Cited

U.S. PATENT DOCUMENTS 7,227,475 B1 * 6/2007 Provenzano ............. G08G 1/20
340/995.12
2001/0037174 A1 11/2001 Dickerson
(Continued)

FOREIGN PATENT DOCUMENTS

EP 1298623 4/2003
KR 10-2013-0130930 12/2013

OTHER PUBLICATIONS

Search Report for corresponding UK Application No. GB1519974.8 dated Apr. 28, 2016, 4 pages.
Translation of KR 10-2013-0130930.

Primary Examiner — Lail A Kleinman
(74) Attorney, Agent, or Firm — Klintworth & Rozenblat IP LLP

(57) ABSTRACT

A system for pairing a passenger having a mobile device with a vehicle is provided. The system includes a link manager located remote from the vehicle, wherein the link manager receives information from a fleet of vehicles and a plurality of passengers. The system also includes vehicle location determining means which generate vehicle location information for the vehicle, and a first wireless communication device which communicates vehicle location information to the link manager and mobile location determining means which generates mobile location information for the mobile device, and a second wireless communication device which communicates mobile location information to the link manager. The link manager matches the mobile location information with the closest matching vehicle location information received.

29 Claims, 5 Drawing Sheets

(56) References Cited

U.S. PATENT DOCUMENTS

| | | |
|---|---|---|
| 2004/0076280 A1 | 4/2004 | Ando et al. |
| 2006/0276960 A1 | 12/2006 | Adamczyk et al. |
| 2008/0195428 A1* | 8/2008 | O'Sullivan ............ G06Q 10/00 705/6 |
| 2013/0013381 A1 | 1/2013 | Liu |
| 2013/0060586 A1 | 3/2013 | Chen et al. |

* cited by examiner

SYSTEM AND METHOD FOR PAIRING PASSENGERS AND IN-VEHICLE EQUIPMENT

CROSS-REFERENCE TO RELATED APPLICATIONS

This application claims benefit of priority to U.S. Provisional Application Ser. No. 62/085,621, filed Nov. 30, 2014, and entitled "System and Method for Pairing Passengers and In-Vehicle Equipment," the contents of which are herein incorporated by reference in its entirety.

FIELD OF THE INVENTION

The present invention relates generally to in-vehicle equipment for a fleet of motor vehicles. In particular, the invention relates to a system and method for pairing a passenger and a mobile device with a vehicle and in-vehicle equipment.

BACKGROUND

The process of managing a fleet of vehicles for hire, such as taxis, trains, buses and limousines, and the associated business considerations, can be quite cumbersome. For example, for a taxi service that accepts passengers on the street on an ad hoc basis, the driver typically maintains a "trip sheet" which contains relevant information for his shift in the vehicle. The information includes information about each fare—starting location, ending location, time, fare amount, etc. This information has conventionally been captured manually by each fleet owner when the driver returns the vehicle at the end of the shift. It is also used as the basis for settlement between the driver and fleet manager, and the settlement process can be quite extensive and time consuming.

This method of data capture is inefficient and results in data loss, poor reporting, and errors in the basic analysis of trip data. In many locations, the number of vehicles permitted to carry passengers for hire is limited, and it is disadvantageous when the revenue attributable to a vehicle is not maximized.

There have been recent technological advances so that, for example, the location of fleet vehicles can be determined, in real-time or near real-time, and communications containing content provided with passengers in each vehicle. The location information can be used to, for example, retrieve property left behind in a vehicle or identify a vehicle involved in an incident based on location and time of day. When passengers forget property in a vehicle, they typically can only provide the starting location, ending location, and approximate time of the trip. The communications may consist of Internet sessions or e-mail communications. The communications may also consist of advertisements that are initiated by a central distribution point and simultaneously pushed out to the vehicles over wireless communication links to be displayed to the passengers. See, for example, U.S. Pat. No. 7,227,475 issued to Provensano et al.

Additionally, many fleet vehicles would like to use a central billing system via which a passenger can pay a driver of a vehicle for fare accumulated during a trip. As a result, it is advantageous for many reasons, to pair a passenger along with passenger information 204 about the passenger with a vehicle and vehicle information 205 about the vehicle and driver. The reasons include assisting the passenger in providing payment to the driver for fare accumulated during a trip, providing communications to the passenger which are specific to each passenger's needs or interests, sharing vehicle information 205 with the passenger to allow things such as locating which vehicle and which driver was used by the passenger during a given period, and sharing passenger information 204 with the driver in order to complete payment or in order to provide the driver with demographic information about the passenger.

Various method for pairing a passenger with a vehicle, including prompting the passenger to enter a code or other identifying information into a display device found within the vehicle, identifying the vehicle via a vehicle identification number in a mobile device of the passenger, and emitting a tone via the passenger's mobile device to be receive by a computer within the vehicle. All of these method are not passive, but rather active methods which require the passenger to act in some manner, whether that be to play a test tone, or to input information into the mobile device or a vehicle computer such as a display device found within the vehicle. It would be advantageous to have methods, systems and software that allow for a passive pairing of the passenger with the vehicle.

SUMMARY

In one aspect, a system for pairing a passenger having a mobile device with a vehicle is provided. The system includes, but is not limited to, a link manager located remote from the vehicle, vehicle location determining means, and mobile location determining means. The vehicle location determining means generate vehicle location information for the vehicle. A vehicle trip status means generates vehicle trip status information regarding a trip being conducted by the vehicle. A first wireless communication device communicates vehicle location information and vehicle trip status information to the link manager. The mobile location determining means generates mobile location information for the mobile device. A mobile trip status means generates mobile trip status information regarding a trip being conducted by the mobile device. A second wireless communication device communicates mobile location information and mobile trip status information to the link manager. The link manager matches the mobile location information and the mobile trip status information with the closest matching vehicle location information and vehicle trip status information received.

In one aspect, a system for pairing a passenger having a mobile device with a vehicle is provided. The system includes, but is not limited to, a link manager located remote from the vehicle. The link manager receives information from a fleet of vehicles and a plurality of passengers. The system also includes, but is not limited to, vehicle location determining means and mobile location determining means. The vehicle location determining means generate vehicle location information for the vehicle. A first communication device communicates vehicle location information to the link manager. The mobile location determining means which generates mobile location information for the mobile device. A second communication device which communicates mobile location information to the link manager. The link manager matches the mobile location information with the closest matching vehicle location information received.

In one aspect, a computer-implemented method for proximity pairing a passenger having a mobile device with a vehicle conducting a trip is provided. The method includes, but is not limited to, determining a vehicle location of the vehicle and generating vehicle location information and determining a mobile location of the mobile device and generating mobile location information. The method also includes, but is not limited to, generating pairing information using a link manager and pairing the mobile device with the vehicle using the pairing information generated by the link manager. The link manager includes a computer processor which receives the vehicle location information and the mobile location information and pairs the mobile device with the vehicle based upon the vehicle location information and the mobile location information.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those skilled in the art will appreciate that some of the acts and operations described hereinafter can also be implemented in hardware, software, and/or firmware and/or some combination thereof.

Figure 1:
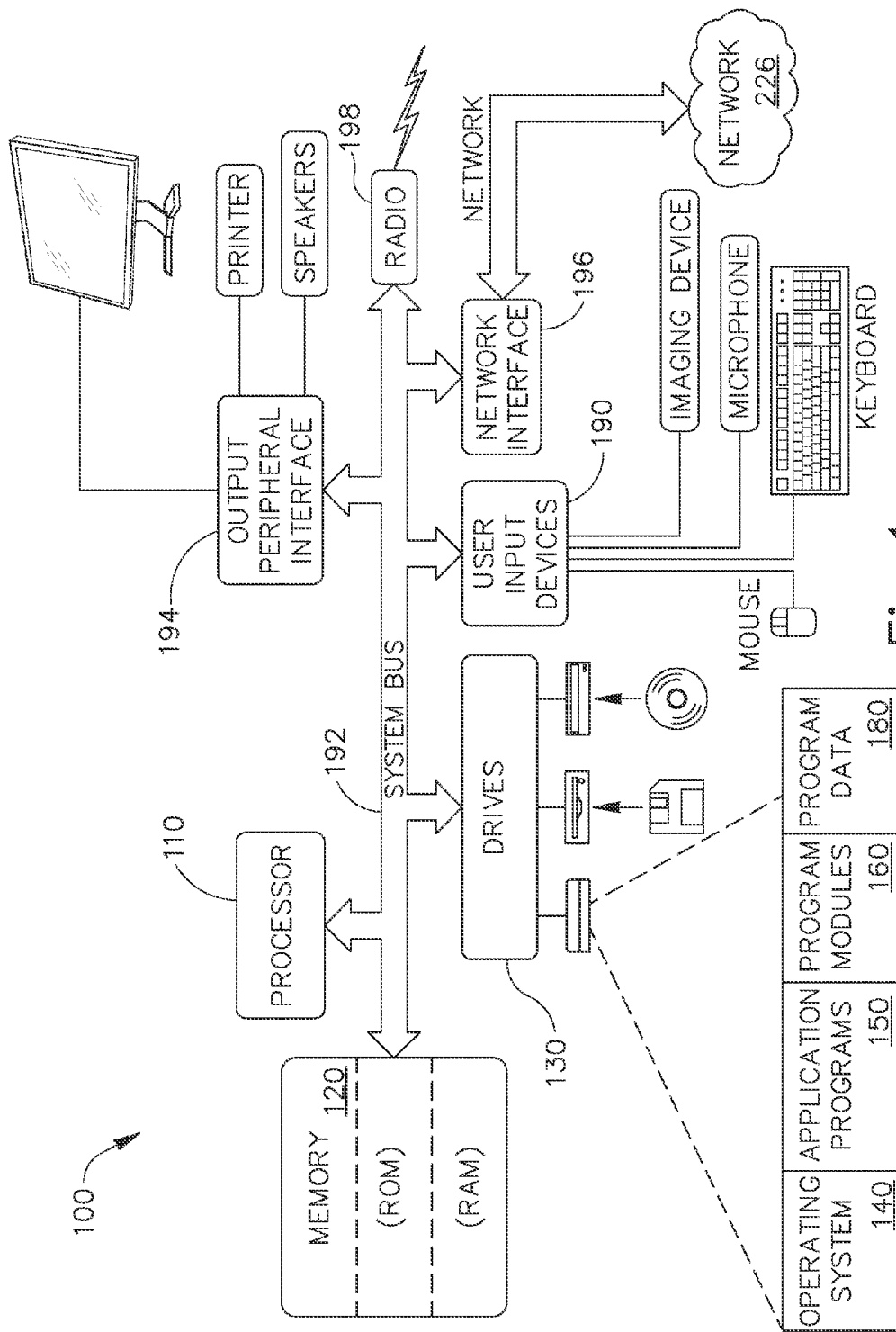
FIG. 1 depicts a block schematic diagram of an exemplary computing system, in accordance with one embodiment of the present invention.

With reference to FIG. 1, depicted is an exemplary computing system for implementing embodiments. FIG. 1 includes a computer 100, which could be any one of a local or mobile device 200 through which a user may interact with, in-vehicle equipment 203 through which a driver or user may interact with, or a remote server 240 which is remote from the a local or mobile device 200 and the in-vehicle equipment 203. In one embodiment, the remote server is a link manager 420 located remote from the vehicle 199. Computer 100 may be a mobile device, wherein at least some or all of its components are formed together in a single device which can be carried around by a user or person, such as a mobile telephone, a tablet, a laptop computer, or a watch. Computer 100 may also be a local device which is locally accessible by a user, such as an automobile touchscreen computer or a local kiosk, and which may or may not be carried around by a person. A local device may comprise a mobile device. The computer 100 includes a processor 110, memory 120 and one or more storage devices 130. The storage devices 130 and their associated computer readable memory medium provide storage of computer readable instructions, data structures, program modules and other data for the computer 100. Storage devices 130 can include an operating system 140, application programs 150, program modules 160, and program data 180. Computer 100 further includes input devices 190 through which data may enter the computer 100, either automatically or by a user who enters commands and data. Input devices 190 can include an electronic digitizer, an image scanner, a barcode reader, a microphone, a camera, a video camera, a keyboard and a pointing device, commonly referred to as a mouse, a trackball or a touch pad, a pinpad, any USB device, any Bluetooth enabled device, an RFID or NFC device, and a debit card reader. Other input devices may include a joystick, game pad, satellite dish, scanner, and the like. In one or more embodiments, input devices 190 are portable devices that can direct display or instantiation of applications running on processor 110.

These and other input devices 190 can be connected to processor 110 through a user input interface that is coupled to a system bus 192, but may be connected by other interface and bus structures, such as a parallel port, game port or a universal serial bus (USB). Computers such as computer 100 may also include other peripheral output devices such as speakers, printers, and/or display devices, which may be connected through an output peripheral interface 194 and the like.

Computer 100 also includes a radio 198 or other type of communications device for wirelessly transmitting and receiving data for the computer 100 with the aid of an antenna. Radio 198 may wirelessly transmit and receive data using WiMAX™, 802.11a/b/g/n, Bluetooth™, 2G, 2.5G, 3G, and 4G, wireless standards.

Computer 100 may operate in a networked environment using logical connections to one or more remote computers, such as a remote server 240. The remote server 240 may be a personal computer, a server, a router, a network PC, a peer device or other common network node, and may include many if not all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note, however, that source and destination machines need not be connected by a network or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN, such as radio 198, to environments such as the Internet. It will be appreciated that other means of establishing a communications link between computer 100 and other computers may be used.

Figure 2:
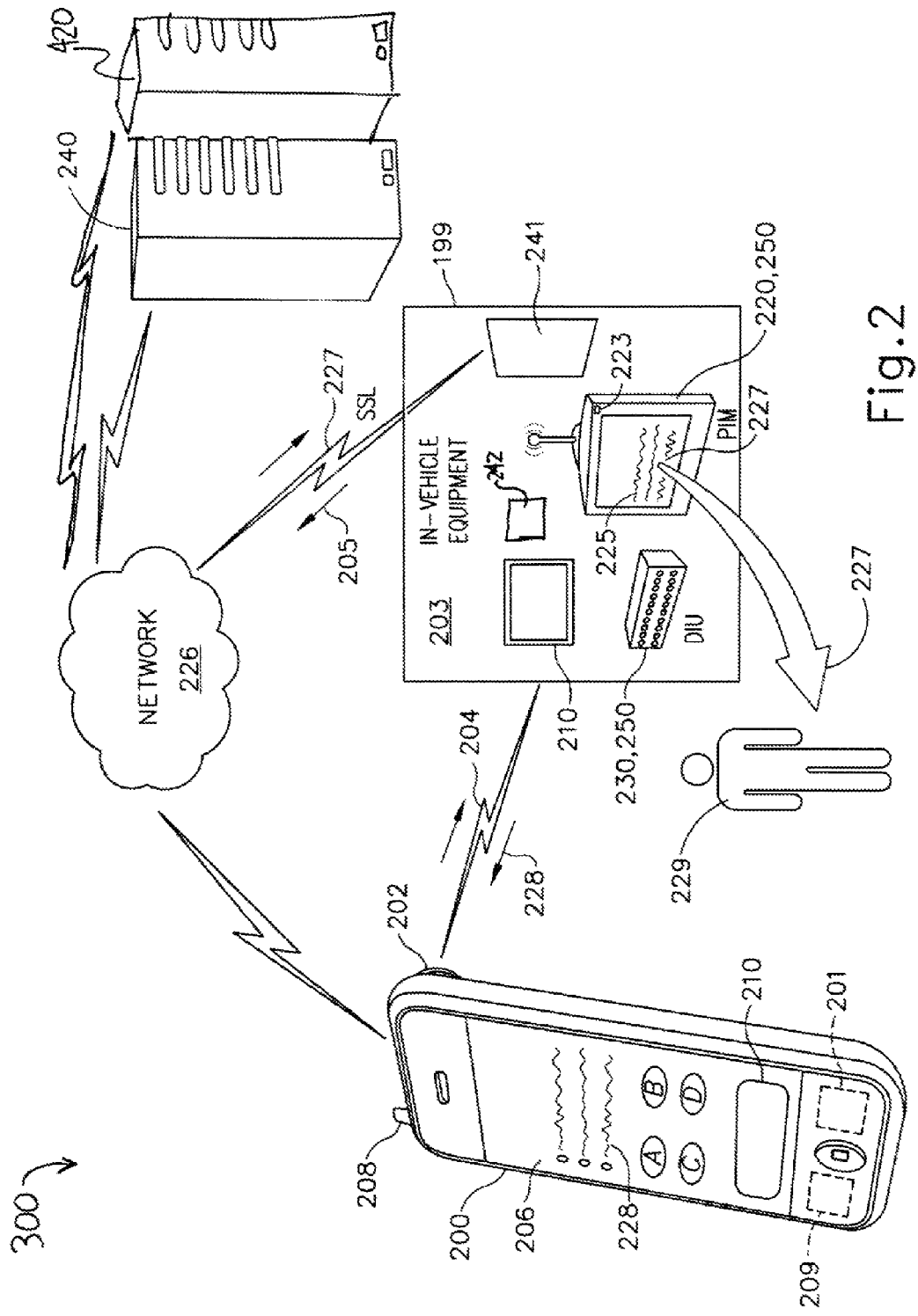
FIG. 2 depicts an illustration of a mobile device interacting with and communicating with in-vehicle equipment within a vehicle, in accordance with one embodiment of the present invention.

With reference to FIG. 2, illustrated is an exemplary representation of a system 300 for pairing a passenger 229 having a local or mobile device 200 with a vehicle 199 having in-vehicle equipment 203. Preferably, the system 300 pairs the passenger 229, and more specifically passenger information 204 regarding the passenger 229, with the vehicle 199 in which the passenger 229 is traveling within to reach a destination using a link manager 420. Preferably, the passenger information 204 is paired with vehicle information 205 regarding the vehicle 199. Preferably, passenger information 204 is information regarding the passenger 229 and preferably a specific account owned by the passenger 229, and includes information such as the passenger's name, address, account number, payment information, and any identifying information for the passenger 229. Preferably, vehicle information 205 is information regarding the vehicle 199 and the driver driving the vehicle, such as a specific account owned by the driver or associated with the vehicle and/or the fleet of vehicles, the driver's name, address, account number, payment information, and any identifying information for the driver or vehicle 199.

The driver or vehicle 199 are engaged by the passenger 229 to conduct a trip to take the passenger 229 to a predetermined destination at a predetermined fare or calculated fare, whereby the passenger provides the driver or a device within the vehicle 199 with payment for the trip in the amount of the fare. Preferably, the passenger 229 and the driver and/or vehicle 199 are both associated with or registered within a platform or program in which the passenger 229 and the driver or vehicle 199 are members. By being members of the platform, both the passenger 229 and the driver or vehicle 199 are able to exchange information between each other in order to provide certain benefits to each during the trip. For example, the passenger 229 may provide payment information to the driver, such as a credit card number or bank account number from which payment is withdrawn in order to pay for the fare. Additionally, the driver or vehicle 199 or devices within the vehicle 199, such as a PIM 220, may communicate content to the passenger 229, such as advertisements, e-mail, news, current fare amount, travel times, weather, and other such information. In order to exchange information between the passenger 229 and the driver or vehicle 199, a pairing must occur between the passenger 229, and passenger information 204 associated with the passenger 229, and the vehicle 199, and vehicle information 205 associated with the vehicle 199. Preferably, both the passenger 229 and the driver or vehicle 199 each have accounts registered with the platform or program, wherein the passenger 229's account includes passenger information 204 and the driver or vehicle 199's account includes vehicle information 205. The pairing between the passenger 229 and the vehicle 199 should occur only when the passenger 229 is a passenger within the vehicle 199, and not another vehicle 199. Since there are many passengers and many vehicles within a platform, it is important to determine which passenger is riding within which vehicle in order to the correct information to be exchanged between the passenger 229 and the vehicle 199.

Each passenger 229 carries a local or mobile device 200 through which the passenger 229 accesses the platform or program using the passenger's account which contains the passenger information 204 about the passenger 229. Additionally each driver or vehicle 199 includes in-vehicle equipment 203 through which the driver or vehicle 199 accesses the platform or program using the driver or vehicle's account which contains the vehicle information 205 about the vehicle 199 or driver.

Local or mobile device 200 includes any local or portable electronic device having a processor 201 for executing applications and a display 206 for displaying information connected with the processor 201, and includes such devices as a personal desktop assistant (PDA), a portable computer, a mobile telephone such as a smartphone, a watch such as a smartwatch, a netbook computer, a notebook computer or any other type of mobile computer, or a tablet computer. The mobile device 200 is local to the passenger 229 and is capable of moving with the passenger 229 when the passenger 229 moves from one location to another. Preferably the mobile device 200 is a device owned and operated by the passenger 229. Display 206 can use any of a variety of types of display technologies, such as a liquid crystal display (LCD), a cathode-ray tube type display, an electronic ink display, a light emitting diode (LED) type display such as an OLED display, and a plasma display. Preferably, the mobile device 200 also includes a communications device 208 and an internal location determining means 202 such as a global position system (GPS) unit having a GPS receiver and processing means for generating mobile location information which defines a geographical location or provides geographical coordinates at or where the mobile device 200 is located. The communications device 208 is connected with the processor 201 and capable of sending and receiving information between one or more other computers connected with the mobile device 200.

Preferably, communications device 208 is capable of wirelessly transmitting signals to another computer, such as remote server 240 or link manager 420, using a radio transmitter and a radio receiver connected with an antenna. The communications device 208 is capable of sending and receiving all types of information, such as passenger information 204, mobile location information, and mobile trip status information, between the mobile device 200 and other devices, such as in-vehicle equipment 203 or link manager 420, in a format that a processor 201 can read, such as digital data. Preferably, communications device 208 includes any device or combination of devices which can send and/or receive information such as: a near-field communication (NFC) sensor; a wireless transceiver using any one of a number of wireless protocols, such as Bluetooth, wireless a/b/g/n/ac, 2G, 3G, 4G, and LTE; a digital camera; a speaker; and any other type of digital or analog communications device.

In-vehicle equipment 203 includes a variety of electronic devices which is located within a fleet vehicle 199, such as a taximeter or meter 210 which is a mechanical or electronic device installed in taxicabs and other vehicles that calculates passenger fares based on a combination of distance traveled and waiting time, a passenger information monitor (PIM) 220, a driver interactive unit (DIU) 230, and a wireless communication device 241. The in-vehicle equipment 203 is preferably coupled to a remote server 240 via a network 226, preferably using a wireless communication device 241, and presents content 227 to the passenger 229 such as for example fleet logos; driver identification; map information; account information; informative information such as news and weather; multimedia content such as advertising, movies, or shows; interactive content such as games or surveys; and any other types of content which can be obtained. The PIM 220 presents content 227 to the passenger 229, such as by playing multimedia content or presenting interactive content to the passenger 229, in any number of ways using any number of devices which can be sensed by the passenger 229, such as speakers which emit sound, lighting elements and/or displays which transmit light and/or display images, and/or vibrational elements which may transmit vibrations. PIM 220 may present information to the passenger 229 using a speaker 223 which emits sound and/or a display 225 which displays images.

Preferably, primary content 227 is streamed from a remote server 240 through wireless communication device 241 and stored in any storage device 130 or computer 250 located within the vehicle 199, such as PIM 220 or DIU 230. Computer 250 is any computer located within the vehicle 199 which is in communication with wireless communication device 241 and which access to a storage device 130 for storing content 227. Computer 250 may include any computer located within the vehicle having access to a storage device 130, such as PIM 220 and DIU 230. Preferably, primary content 227 is filtered in advance before being transmitted to the computer 250 based on the passenger information 204 and/or vehicle information 205. Optionally, primary content 227 is filtered based on the passenger information 204 and/or vehicle information 205 upon being transmitted to the computer 250 but before being presented to the passenger 229. Optionally, meter 210 is connected to PIM 220 so as to present fare and toll information via PIM 220 to the passenger 229.

Preferably, communications device 208 is capable of communicating with computer 250 and/or remote server 240, either directly or via a network 226 using a network interface 209 in order to receive additional content 228. Network interface 209 is connected with processor 201 and communications device 208, and preferably disposed within remote device 200.

Network 226 may include any type of network that is capable of sending and receiving communication signals, including signals for multimedia content, images, data and streaming video. Network 226 may include a data network, such as the Internet, an intranet, a local area network (LAN), a wide area network (WAN), a cable network, and other like systems that are capable of transmitting information, such as digital data, and the like. Network 226 may also include a telecommunications network, such as a local telephone network, long distance telephone network, cellular telephone network, satellite communications network, cable television network and other like communications systems that interact with computer systems to enable transmission of information between mobile device 200 and another computer such as remote server 240. Network 226 may include more than one network and may include a plurality of different types of networks. Thus, network 226 may include a plurality of data networks, a plurality of telecommunications networks, cable systems, satellite systems and/or a combination of data and telecommunications networks and other like communication systems.

Preferably, network 226 is connected with mobile device 200, in-vehicle equipment 203 such as computer 250, and remote server 240 to allow for information to be transmitted and shared between mobile device 200, computer 250, and remote server 240. Additionally, information may be directly exchanged between the mobile device 200 and in-vehicle equipment 203 via link manager 420. Remote server 240 includes any type of computer which can receive, store, process, and transmit information to another computer and includes devices such as a server based computer system capable of interacting with one or more other computer systems.

Link manager 420 is a special purpose device used specifically to determine and pair the passenger 229 with the specific vehicle 199 in which the passenger is traveling in. In one embodiment, the link manager 420 includes a computer processor which receives the vehicle location information and the mobile location information and pairs and creates a linkage between the mobile device 200 with the vehicle 199 based upon the vehicle location information and the mobile location information.

Preferably the link manager 420 matches passenger information 204 associated with the passenger 229 with vehicle information 205 associates with the driver or vehicle 199. Preferably, the link manager 420 is located remote from the vehicle 199 and the mobile device 229. In one embodiment, the link manager 420 utilizes a proximity pairing method to determine that a passenger 229 is associated with and traveling within a vehicle 199 in order to pair and match passenger information 204 associated with the passenger 229 with vehicle information 205 associates with the driver or vehicle 199. The proximity pairing method uses mobile location information which details the location or approximate location of the passenger 229 or mobile device 200, and uses vehicle location information which details the location or approximate location of the driver or vehicle 199, in order to determine and pair the passenger 229 with the specific vehicle 199 in which the passenger is traveling in and then pair and match passenger information 204 with vehicle information 205.

In one embodiment, system 300 includes a mobile location determining means which generates mobile location information for the mobile device 200. In one embodiment, the mobile location determining means uses information generated by an internal location determining means 202 within the mobile device 200 which generates mobile location information detailing the location of the mobile device 200, and in turn, the location of the passenger 229 in possession of the mobile device 200. Internal location determining means 202 preferably includes devices such a Global Positioning System (GPS) unit which preferably includes a GPS receiver, any wireless radio signal receiver such as a cellular radio signal receiver, or a local area wireless (WiFi) radio signal receiver to receive radio signals and use those radio signals to determine the location of the mobile device 200, and in turn the location of the passenger 229. In one embodiment, the mobile location determining means also includes means external to the mobile device 200 for determining location of the mobile device 200, such as devices and systems which receives radio signals from the mobile device 200 and use radio triangulation to determine the location of the mobile device 200 and in turn the location of the passenger 229 and generate mobile location information, which details the geographical location of the mobile device 200, and in turn, the location of the passenger 229. Mobile location determining means may also use IP address information to determine the general location of the mobile device 200. Mobile location determining means may use any one of a number of devices or pieces of information in order to determine the location of the mobile device 200 and generate mobile location information representing the location of the mobile device 200.

In one embodiment, system 300 includes a vehicle location determining means which generates vehicle location information for the vehicle 199. In one embodiment, the vehicle location determining means uses information generated by an internal location determining means 242 within the vehicle 199 which generates mobile location information detailing the location of the vehicle 199, and in turn, the location of the driver driving the vehicle 199. Internal location determining means 242 preferably includes devices such a Global Positioning System (GPS) unit which preferably includes a GPS receiver, any wireless radio signal receiver such as a cellular radio signal receiver, or a local area wireless (WiFi) radio signal receiver to receive radio signals and use those radio signals to determine the location of the vehicle 199, and in turn the location of the driver. In one embodiment, the vehicle location determining means also includes means external to the vehicle 199 for determining location of the vehicle 199, such as devices and systems which receives radio signals from the vehicle 199 or in-vehicle equipment 203 and use radio triangulation to determine the location of the vehicle 199 and in turn the location of the driver and generate vehicle location information, which details the geographical location of the vehicle device 200, and in turn, the location of the driver. Vehicle location determining means may also use IP address information to determine the general location of the vehicle 199. Vehicle location determining means may use any one of a number of devices or pieces of information in order to determine the location of the vehicle 199 and generate mobile location information representing the location of the vehicle 199.

Preferably, the vehicle location information includes one of geographical coordinates, address information such as a city, state, street or name of a place at which the vehicle 199 is at or near, IP address information for equipment connected with a first wireless communication device which is at or near the vehicle 199, or defines a geographical area or zone in which the vehicle 199 is located in. In one embodiment, the vehicle location determining means is external to the vehicle 199 and analyzes signals or information transmitted from the vehicle 199.

Preferably, mobile device 200 includes input means 211 for entering information from the passenger 229 into the mobile device 200. Input means includes any device which can assist a user to enter information, such as a keyboard, a mouse, a touchpad, a touchscreen, a joystick, a button, and a dial.

Preferably, in addition to location information, the proximity pairing method also uses vehicle trip status information regarding a trip being conducted by the driver and vehicle 199 and mobile trip status information regarding a trip being conducted by the mobile device 200 and passenger 229, in order to determine and pair the passenger 229 with the specific vehicle 199 in which the passenger is traveling in and then pair and match passenger information 204 with vehicle information 205. Preferably the vehicle trip status information is generated by vehicle trip status means which is preferably part of the vehicle location determining means, however it may be a separate device this as well. Preferably the mobile trip status information is generated by mobile trip status means which is preferably part of the mobile location determining means, however it may be a separate device this as well. Either way, the vehicle trip status means and mobile trip status means is any device which contains information regarding the status of a trip that the vehicle 199 is taking the passenger 229 on, or which can generate, using other information (such as GPS information along with time and date information) in order to generate information regarding the status of a trip that the vehicle 199 is taking the passenger 229 on.

Preferably, the vehicle trip status information includes information as to where the vehicle 199 is traveling and the mobile trip status information includes information as to where the mobile device 200 and passenger 229 are traveling to, that is information about their trip. Preferably, the vehicle trip status information includes time information for the time of day which the vehicle trip status information was generated. The time information is used by the proximity paring method to assists the proximity link manager 420 in accurately pairing the passenger 229 with the vehicle 199 the passenger 229 is traveling in. Preferably, the vehicle trip status information includes a current direction that the vehicle 199 is traveling in (i.e. north, east, south, or west), a current speed of the vehicle 199, or any known destination or trajectory of the vehicle 199. The destination or trajectory of the vehicle 199 may be information provided by in-vehicle equipment 203 or the driver of the vehicle.

Preferably, the mobile trip status information includes time information for the time of day which the mobile trip status information was generated. The time information is used by the proximity paring method to assists the proximity link manager 420 in accurately pairing the passenger 229 with the vehicle 199 the passenger 229 is traveling in. Preferably, the mobile trip status information includes a current direction that the mobile device 200 is traveling in (i.e. north, east, south, or west), a current speed of the mobile device 200 (using for example GPS coordinates and time information), or any known destination or trajectory of the mobile device 200. The destination or trajectory of the mobile device 200 may be information provided by devices or applications within the mobile device 200, or the passenger 229 associated with the mobile device 200.

Preferably, the vehicle location determining means includes a first communication device, preferably wireless, which communicates vehicle location information, and preferably, also communicates vehicle trip status information to the link manager. However, the vehicle trip status information may be communicated directly from the vehicle 199 via in-vehicle equipment 203.

Preferably, the mobile location determining means includes a second communication device, preferably wireless, which communicates mobile location information, and preferably, also communicates mobile trip status information to the link manager. However, the mobile trip status information may be communicated directly from the mobile device 200 to the link manager.

Preferably, the vehicle location information includes first time information for a time of day which the vehicle location information was generated. Preferably, the mobile location information includes second time information for a time of day which the mobile location information was generated, and the proximity pairing method within the link manager uses the first and second time information to help match the mobile location information with the closest matching vehicle location information received.

Preferably, the mobile location information includes one of geographical coordinates, address information such as a city, state, street or name of a place at which the mobile device 200 is at or near, IP address information for equipment connected with a second wireless communication device which is at or near the mobile device 200, or defines a geographical area or zone in which the mobile device 200 is located in. In one embodiment, the mobile location determining means is external to the mobile device 200 and analyzes signals or information transmitted from the mobile device 200.

Upon receiving the mobile location information and the vehicle location information, and preferably also receiving the mobile trip status information and the vehicle trip status information, the link manager 420 then matches the mobile location information and the mobile trip status information with the closest matching vehicle location information and vehicle trip status information received in order to determine what vehicle 199 passenger 229 is traveling in, so that information between the passenger 229 and the vehicle 199 can be exchanged and communicated.

Figure 3:
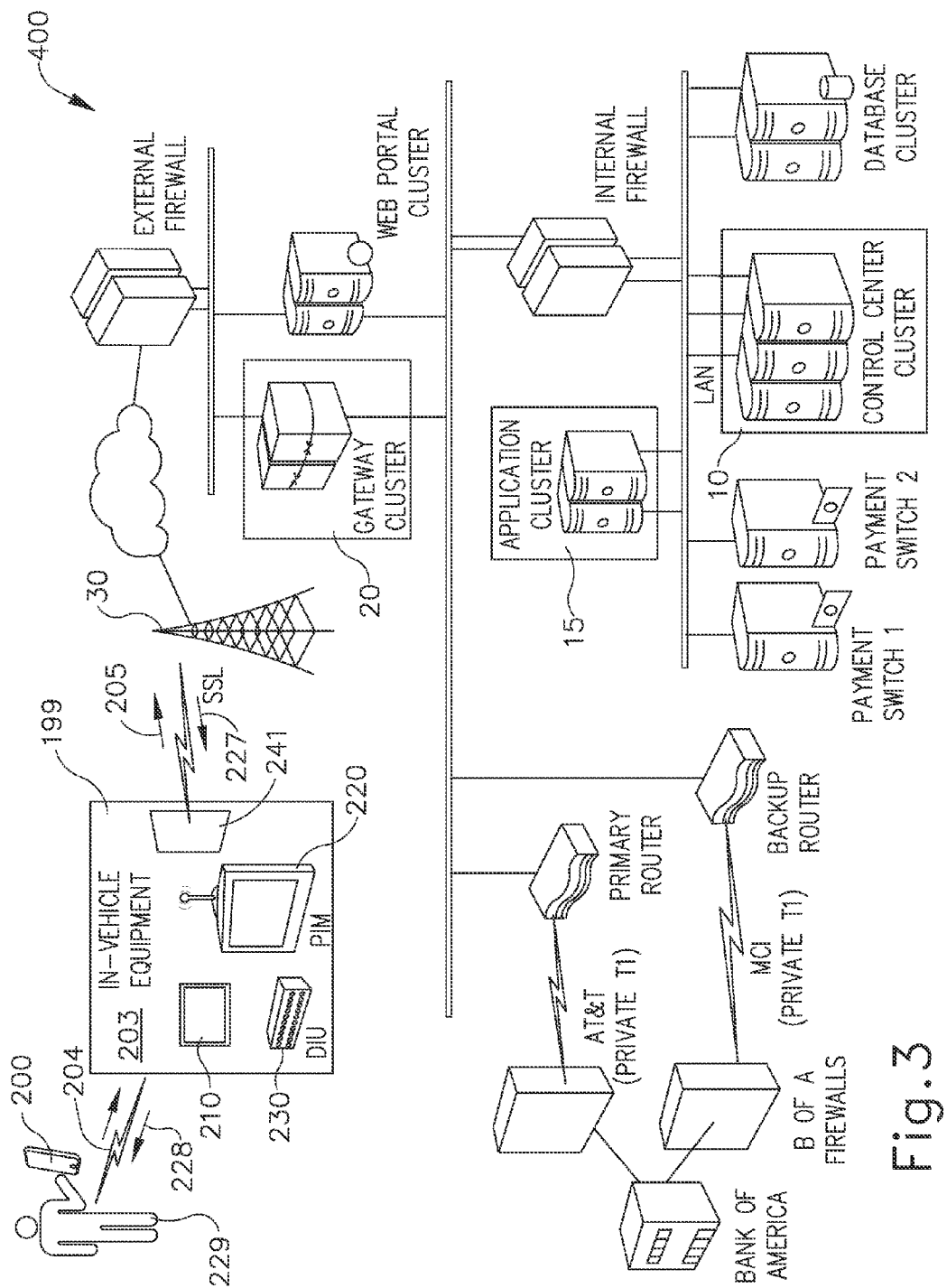
FIG. 3 depicts a system level illustration of interactions between a passenger, a mobile device, and in-vehicle equipment, in accordance with one embodiment of the present invention.

Referring now to FIG. 3, it shows an overall environment in conjunction with which the preferred embodiments of commercial ground vehicle-to-passenger linking and content management system 400 may be practiced. The system 400 obtains and communicates a plurality of types of information 204, 205, 227, and 228 with passengers 229 in a number of vehicles 199. Specifically, the system 400 obtains and communicates passenger information 204 which is related to the passenger 229 and preferably obtained from the passenger 229 or derived from the environment around the passenger 229. The system 400 obtains and communicates vehicle information 205 which is obtained from in-vehicle equipment 203 or the environment around the vehicle 199. The system 400 obtains and communicates primary content 227 which is obtained and then communicated to the passenger 229 and/or the mobile device 200, preferably based in-part upon the passenger information 204 and the vehicle information 205. The system 400 also obtains and communicates additional content 228 which is obtained and then communicated to the passenger 229 via the mobile device 200 based in-part upon the passenger information 204 and the vehicle information 205.

In addition to the in-vehicle equipment 203 described herein, the system 400 further includes a central control center 10, a gateway 20, and a wireless service provider 30. The wireless service provider 30 provides a distribution network for communicating information 204, 205, 227, and 228 to and from each of the vehicles 199. The wireless service provider 30, gateway 20 and the central control center 10 are configured to be able to handle a large number of simultaneous communication channels from a plurality of vehicles 199. There may also be at least one content provider (not shown in FIG. 3), providing general content to be controllably distributed to the plurality of vehicles 199. Preferably, the primary content 227 is targeted content derived from the general content and based upon the passenger information 204 and/or the vehicle information 205.

Gateway 20 is a messaging gateway that communicates and maintains connections with each vehicle 199. Central control center 10 is the message processing application for all inbound and outbound communication with in-vehicle equipment 203, and preferably, with PIM 220. It must guarantee delivery of all messages to and from gateway 20, and must capture and store all messages for debugging and auditing purposes, including text messages which are delivered, undelivered, responses errors, etc. Preferably, central control center 10 only accepts messages from gateway 20 over a secure intranet using, for example, a Secured Sockets Layer (SSL) protocol, or over a Virtual Private Network (VPN) and should reject messages from invalid sources. Central control center 10 and gateway 20 should preempt any other message for all emergency messages. Central control center 10 provides an interface to monitor health of the gateway 20 both next to real-time and historical reporting. Monitoring data to be provided includes gateway queue sizes (in/out), central control center queue sizes (in/out), gateway connections, messages per second and total error messages.

Additionally, the system 400 includes a locationing system whereby the geographical location of each respective vehicle 199 can be determined and vehicle location information for each vehicle 199 can be generated. The locationing system relies on location information which may be provided by the wireless service provider 30, or by a separate Global Positioning System (GPS), or by a combination of both. Location information provides details regarding the geographical location of an individual or item. Preferably, vehicle location information detailing the geographical location of each vehicle 199 is provided to the central control center 10 in real-time or near real-time and also provided to the link manager 420 in real-time or near real-time.

Furthermore, central control center 10 captures all shift data (such as logon, logoff, power on, power off, etc.) from the vehicles 199, and preferably all messages relating to shift and fares. Preferably, central control center 10 also capture trip records, vehicle identification and owner identification data, trip identification and authorization limit (on-line, floor limit), vehicle status (live or out-of-service), captured batches (date, batch number, total fares, total transactions), and fare data (date, trip number, batch number, itemized fare).

In particular, the wireless service provider 30 may receive certain passenger information 204, such as payment information, from passengers 229, forwards the payment information to a credit card processor, and selectively returns a verification that the payment was successfully made. The wireless service provider 30 provides a plurality of other communication functions, such as text messages and internet access to passengers in a plurality of vehicles 199.

Typically, a fleet vehicle 199 is equipped with a meter 210, a passenger information monitor (PIM) 220, a driver interactive unit (DIU) 230 and a wireless communication device 241. The PIM 220 is coupled to the central gateway 20 through wireless communication device 241, and provides primary content 227 to the passenger 229, which is preferably targeted content based upon additional information such as passenger information 204 and vehicle information 205, and may include thing such as fleet logos, driver identification, and a map or route information. Primary content 227 is preferably selected from a library of general content which is provided to, and preferably downloaded in advance and stored on, the in-vehicle equipment 203, such as PIM 220. Preferably, primary content 227 is targeted content selected from the library of general content based upon additional information such as passenger information 204 and vehicle information 205. The primary content 227 may include multimedia content such as movies, television shows, advertising, videos, news, books, literature, magazines, audio recordings, and music. The multimedia content may be communicated to the in-vehicle equipment 203 through wireless communication device 241, which is stored in the vehicle 199, or any combination of devices, such as being downloaded through wireless communication device 241 and cached on a storage device 130 in the vehicle 199.

Preferably, PIM 220 is a mobile computer 100 comprising a display 225, such as an integrated touch screen display, recessed into a partition and directly viewable by a passenger 229 positioned in a passenger seat of the vehicle 199. Preferably, PIM 220 includes a card reader for receiving financial information from a credit card or debit card. Preferably, PIM 220 also includes other peripherals used for presenting primary content 227, such as speakers 223, and certain peripherals for interacting with the primary content 227, such as a capacitive touchscreen display, buttons, and/or a keyboard.

Preferably, during a trip in the vehicle 199, PIM 220 allows passengers 229 to track their journey on one of several maps with different views and to monitor tolls and surcharges. The passenger may also watch primary content 127, such as multimedia content, on the display 225, and in some embodiments, optionally use the PIM 220 to access the Internet via wireless communication device 241 using a wireless network 226, as shown in FIG. 2. At the end of the trip, PIM 220 may enable the passenger 229 to pay for a fare using one of a number of payment means, such as a credit card, a debit card, or an NFC device. Optionally, the PIM 220 may provide for the easy calculation of tips by interaction with the display 225. All this requires though that the passengers 229 be accurately paired with the respective vehicle 199 in which they each are traveling. The proximity pairing method used by the proximity link manager 420 allow this pairing to occur.

Preferably, the PIM 220 in each respective vehicle 199 itself initiates polling communications with central control center 10 in order to provide or obtain information 204, 205, 227, 228 to and/or from the central control center 10. In these polling communications, the PIM 220 may announce itself and inform the central control center 10 of its software version, advertising version and other important operating parameters of the PIM 220. PIM 220 can then be updated as desired. Preferably, these polling communications do not occur at points in times that are in common with other vehicles 199 in the fleet. For example, polling communications can be made to occur periodically and/or whenever PIM 220 is powered on or otherwise comes on-line.

Since the PIMs 220 of each vehicle 199 in the fleet will generally be powered on or come online at different times, the polling communications and the updates will occur at different times for different vehicles 199. For periodic polling communications, different vehicles 199 can perform its polling communication at different times. For example, if a polling communication is to be made once per hour, some vehicles 199 can perform polling communications at one minute past the hour (i.e., at 8:01, 9:01, etc.) while other vehicles 199 perform its polling communications at six minutes past the hour (i.e., at 8:06, 9:06, etc). Preferably, PIM 220 is configurable or programmable to operate as described herein to support multiple polling communications with different parameters.

All polling communications need not be the same and updates in response to polling communication need not be handled in the same manner. In particular, the polling communications and updates related to fleet management may be handled differently than other kinds of communications, such as those related to obtaining primary content 227. While news or other kinds of multimedia content may be time sensitive and need to be updated immediately, all updates need not occur immediately after the polling communication. For software updates and other updates that will not be utilized until the PIM 220 is powered off and then on again, the update may be downloaded over a period of time. For polling communications related to time sensitive updates, such as news, the update need not be delivered directly from the central control center, but the central control center 10 may, in response to the polling communication, indicate from where PIM 220 may obtain the update. When the update is complete, PIM 220 reports back the completion to central control center 10.

Central control center 10 keeps an inventory of each PIM 220 in the vehicle fleet and its respective update and download status. An example of a PIM configuration available may include a snapshot of the current status of all updates; software, daily content updates, full look replacements, ticker, and miscellaneous updates. A vehicle 199 may be out-of-service for three days and not make any polling communications during that time. The central control center 10 will track this, and provide missed updates, and may also skip updates that are no longer appropriate to provide because they are untimely, or are superseded by other updates, etc., to manage the PIM 220. However, unlike the previous broadcast distribution, it is incumbent upon each one of the PIMs 220 to check in with the central control center 10 and update itself.

DIU 230 allows a driver of the vehicle 199 to log on and off the system 400 by using a secure passcode, such as a password or personal identification number (PIN). DUI 230 is the driver's primary tool for interacting with the PIM 220 and particularly, for assisting passengers 229 with financial transactions, such as credit card and debit card payments. DUI 230 is preferably a small multi-functional box including a computer that is installed to the right side of the vehicle 199's steering wheel in close reach and easily viewable from the driver's seat. DUI 230 features an easy to use interface, such as a touchscreen or buttons which correspond to various responses that appear on the display 225 of PIM 220—depending upon the action that is currently taking place in the vehicle 199. For example, the driver may facilitate payment transactions by selecting a button or buttons that correspond to simple responses like "'yes" and "no" in response to questions like "are all amounts entered correct?" Through its interface, DUI 230 allows the driver to interact with the PIM 220, and in turn, the passenger 229 via the PIM 220.

DIU 230 is optionally coupled to other devices for displaying messages and may display messages from the fleet manager and, optionally, governmental agencies. Some text messages require no responses and others will prompt the driver to respond using pre-set responses on DIU 230. Predefined text messages can also be sent from the driver to the fleet.

It is known that a content provider, such as an advertiser or media distributor, may provide general content, which then made available for presentation on PIM 220 as primary content 227. The content provider may provide multimedia content, as for example advertisement images and/or text such as news, as well as instructions for distribution of the general content. However, the preferred embodiments utilize PIM 220 to determine the playback or other aspects associated with the general content. For example, general content may be communicated to the PIM 220 with activation criteria, such as time or geographic data, so that when the vehicle and PIM 220 satisfy the activation criteria, the general content is activated without the need for further interaction with central control center 10. This avoids the disadvantage that the general content needs to be downloaded from a central distribution point at the specified time or when the vehicle 199 enters the specified geographic area, in which temporary interruptions in the communication system may disrupt the download, making the preferred embodiments more reliable. There may be information recorded in central control center 10 indicating the number of vehicles 199 and/or time that content has been played. In some embodiments, the passenger 229 may have the ability to override the display of the multimedia content, and the system 400 preferably records the approximate amount of time that content is displayed to passengers.

The system 400 is broken into several application components. A customer facing component which runs on the PIM 220. Gateway and central control center application components work in tandem to service all messages to and from PIM 220. These messages include trip sheet data, credit card processing messages and AVL messages for spatial queries. Additionally, the central control center 10 utilizes payment processing switches to facilitate secure, reliable processing of financial information. Finally, Web Portal and Shared Services application components are used to display and report on all captured data within the system 400. More information on components of system 400 may be found in U.S. patent application Ser. No. 12/171,372, filed on Jul. 11, 2008 and entitled "VEHICLE FLEET MANAGEMENT," is incorporated herein by reference.

Figure 4:
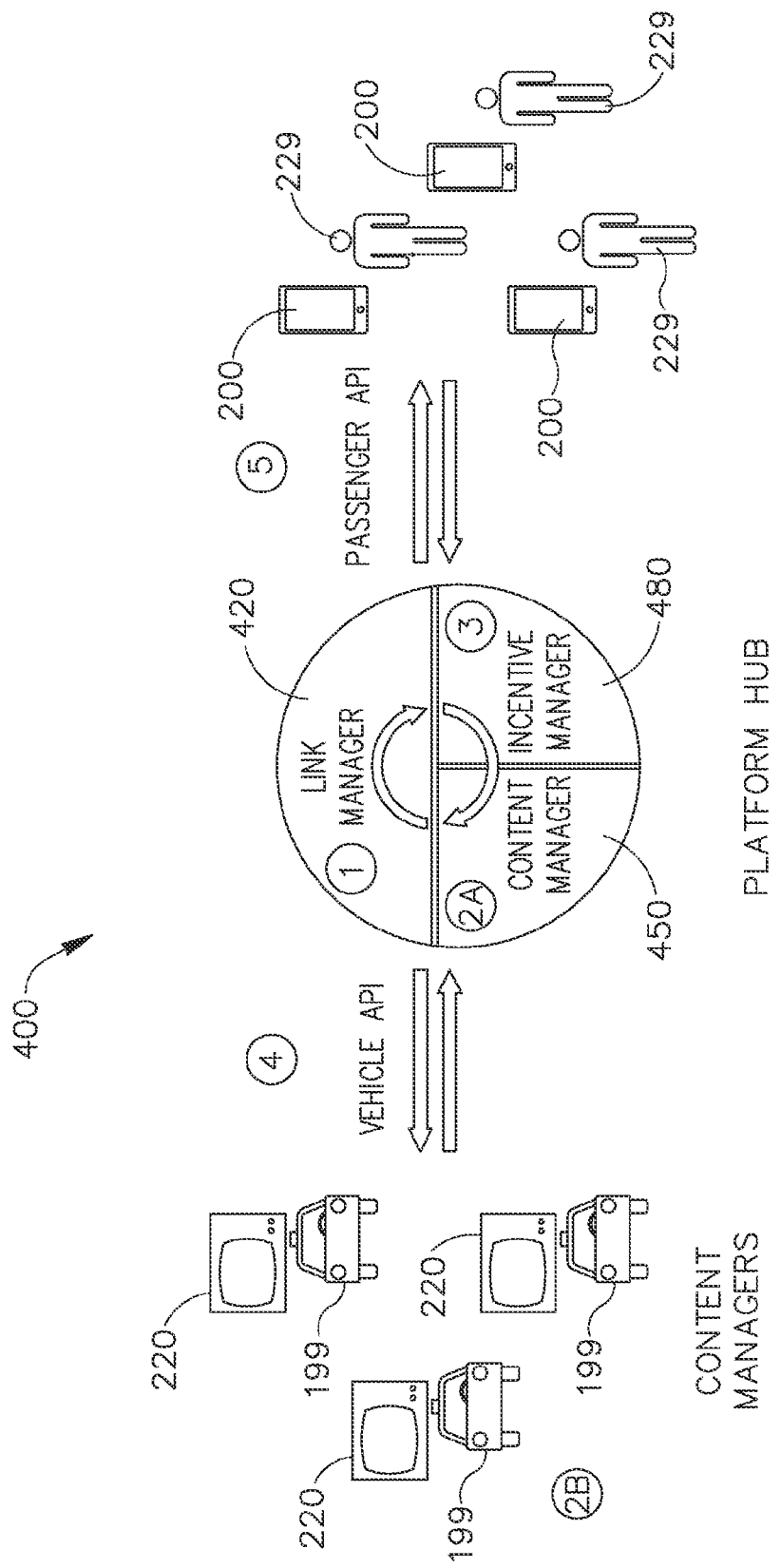
FIG. 4 depicts an illustration of a commercial ground vehicle-to-passenger linking and content management system, in accordance with one embodiment of the present invention.

With reference to FIG. 4, in one embodiment, the commercial ground vehicle-to-passenger linking and content management system 400 includes a link manager 420 which retrieves passenger information 204 from passenger 229 via mobile device 200 and links the passenger information 204 from passenger 229 with vehicle information 205 from the vehicle 199, a content manager 450 which provides primary content 227 to the passenger 229 (via a number ways, such as through the PIM 220 and/or the mobile device 200) based on passenger information 204 and/or vehicle information 205, and an incentives manager which provides incentives to the passenger 229 to receive additional passenger information 204 from the passenger 229 and otherwise participate in a passenger rewards program (which provides rewards to passenger for using system based on, for example, miles traveled within the vehicle 199 and level of participation of the passenger 229). The link manager 420, the content manager 450, and the incentive manager 480 may reside in any one of a number or locations or platform hubs 410, such as a remote server 240, or may be local to and within the vehicle 199, residing in any one of a number of in-vehicle equipment 230 components, such as computer 250. Regardless, the link manager 420, the content manager 450, and the incentive manager 480 are preferably all in communication with the PIM 220, and preferably, also in communication with the mobile device 200.

Figure 5:
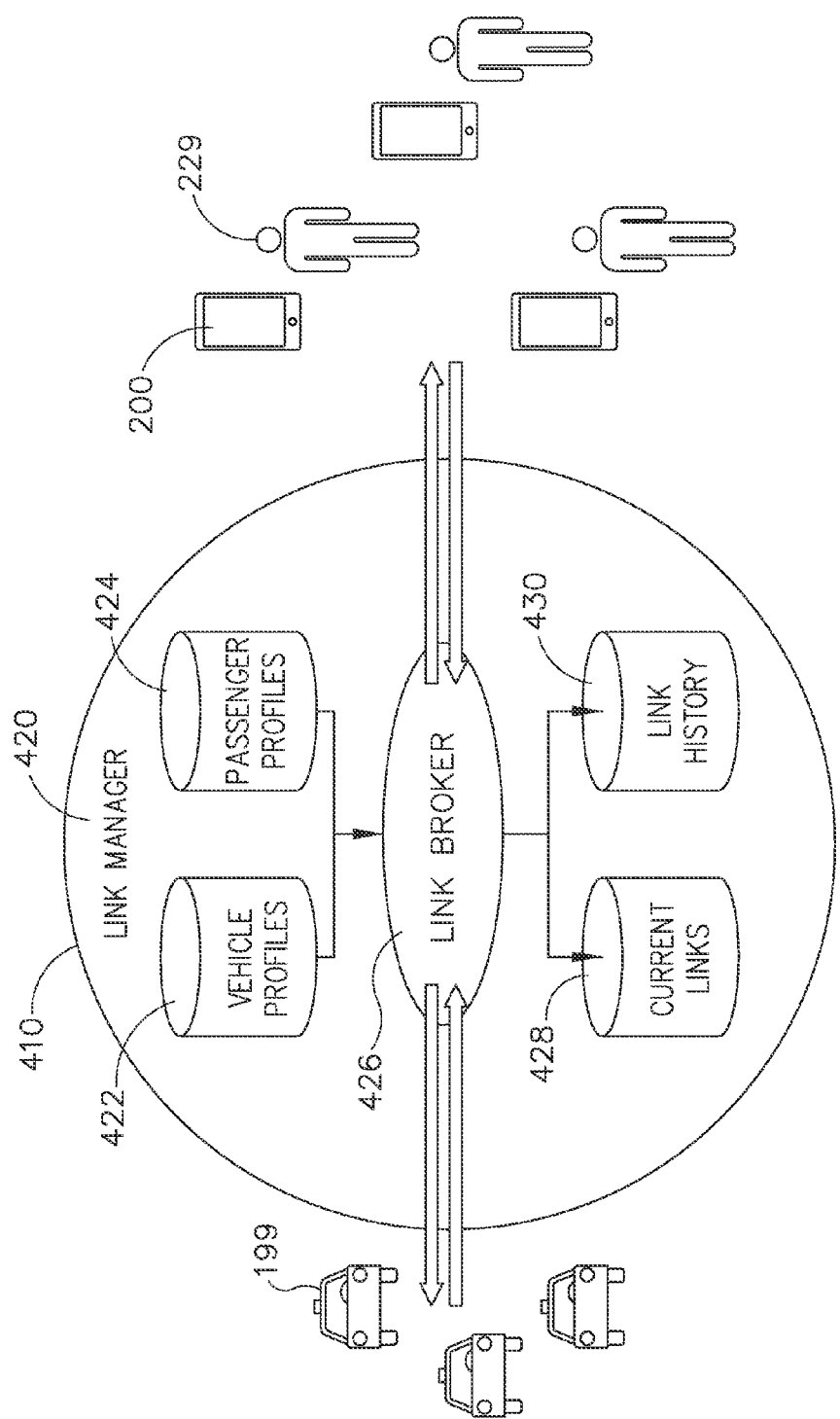
FIG. 5 depicts an illustration of interactions between a link manager of a commercial ground vehicle-to-passenger linking and content management system and passengers and vehicles, in accordance with one embodiment of the present invention.

With reference to FIG. 5, the link manager 420 resides at platform hub 410. Link manager 420 consists of a link broker 426, a passenger profile repository 424 for storing passenger information 204 or a collection of passenger information 204, known as a passenger profile. The link manager 410 also consists of a vehicle profile repository 422 for storing vehicle information 205 or a collection of vehicle information 205, known as a vehicle profile. The link manager 420 also consist of a list of current links table 428, and a link history repository 430. The link manager 420 creates, organizes, and monitors logical links between vehicles 199 and passengers 229, and specifically between vehicle information 205 and passenger information 204. The link manager 420 also provides information to vehicles 199 and in-vehicle equipment 203 and passengers 229 and mobile devices 200 about the existence and status of ongoing links via link broker 426. The link manager 420 also terminates links between vehicle information 205 and passenger information 204 upon request by either in-vehicle equipment 203 or the passenger 229 or mobile device 200. The link manager 410 stores information about both current links table 428 and stores information about prior links in a link history 430, for various related uses.

Link initiation of a linkage between a passenger 229 and a vehicle 199 via the link manager 420 works using the proximity pairing method. First, some piece of in-vehicle equipment 203 or some software running within the vehicle 199 or in communication with some piece of in-vehicle equipment 203, such as a driver device, all simply known as "the requesting vehicle 199" or "the vehicle 199," requests a link ID from the link broker 426 at the platform hub 410. The vehicle 199 sends a vehicle ID to the link broker 426 to begin this process. Then the link broker 426 verifies vehicle eligibility for a link ID via a vehicle profile and status lookup using the vehicle ID as a key. The vehicle ID is any unique identifying information which can be used to uniquely identify the requesting vehicle 199. Then, the link broker 426 generates a unique link ID, and stores this in currently assigned link IDs within current links table 428 along with the vehicle ID of the requesting vehicle 199. The link manager 420 then using the proximity pairing method receives vehicle location information for the vehicle 199, and preferably also receives vehicle trip status information for the vehicle 199 as well. The link manager 420 also receives mobile location information for the mobile device 200, and preferably also receives mobile trip status information for the mobile device 200, as well. Then the link manager 420 analyzes the vehicle location information for each vehicle 199 in a fleet of vehicles, all of which are preferably requesting a link ID, against the mobile location information received for the mobile device 200, and determine the closest matching vehicle 199 or vehicles 199 to the mobile device 200. Preferably, the link manager 420 also analyzes the vehicle trip status information for each vehicle 199 in a fleet of vehicles, all of which are preferably requesting a link ID, against the mobile trip status information received for the mobile device 200, and determine the closest matching vehicle 199 or vehicles 199 to the mobile device 200. If there are multiple matching vehicles 199, then the link manager 420 may request either the passenger via the mobile device 200 or the driver via the in-vehicle equipment 203, to provide additional information to the link manager 420 in order to match and pair the mobile device 200 with the correct vehicle 199 in which the mobile device 200 and the passenger 229 associated with the mobile device 200 are traveling.

In one embodiment, the link manager 420 matches the mobile location information and the mobile trip status information with the closest matching vehicle location information and vehicle trip status information received by matching the direction of the vehicle 199, current speed of the vehicle 199, and/or any known destination of the vehicle 199 with the direction of the mobile device 200, the current speed of the mobile device 200, and/or any known destination of the mobile device 200.

In one embodiment, the link manager 420 transmits pairing information via a link ID indicating what mobile device 200 or passenger 229 is within a certain vehicle 199 to both the mobile device 200 and the vehicle 199 or the in-vehicle equipment 203. Upon matching and pairing the mobile device 200 with the vehicle 199, the mobile device and the vehicle receive the link ID linking the mobile device 200 with the vehicle 199, and allowing for information to be exchanged between the two. The mobile device 200 then either automatically, or via a passenger-initiated event (i.e. button tap or a touchscreen tap) transmits a passenger ID, or human-readable proxy, to the link broker 426 at the platform hub 410. The link broker 426 then validates the passenger ID and link eligibility via a passenger profile, and matches the passenger ID, or human-readable proxy, transmitted by passenger 229 to a link ID in the current links table 428 and stores the relationship between the vehicle ID, the link ID, and the passenger ID along with additional information (time of link, location of link, type of link, etc.). Then the link broker 426 transmits to the vehicle 199, or makes available to the vehicle 199, the passenger ID of the newly linked passenger 229 along with, preferably, additional passenger information 204 about the passenger 229 which had been stored in the passenger profile. The link broker 426 then transmits to the mobile device 200, or makes available to mobile device 200, the vehicle ID of the newly linked vehicle along with (optionally) additional vehicle information 205 about the vehicle 199 and/or driver stored in a vehicle profile.

Preferably, the linking of the passenger ID with the vehicle ID automatically by using the proximity pairing method to pair the mobile device 200 with the vehicle 199 based on their respective location information and trip status information. The linking of information allows the system 400 to identify that a certain passenger 229 is using a certain vehicle 199, and then based upon this information, additional elements of the system 400, such as the content manager 450 or the incentive manager 480, may perform certain actions in response to this linkage. For example, the content manager 450 may decide to select certain primary content 227 for presentation on the PIM 220 and certain additional content 228 for presentation on the mobile device 200 based upon the passenger information 204 and vehicle information 205 associated with the link ID for that linkage.

In one embodiment, upon receiving the link ID, the passenger 229 or driver of the vehicle 200 confirms the accuracy of the pairing information within the link ID. In one embodiment, the link manager 420 transmits a confirmation of pairing to the mobile device 200 confirming that the mobile device 200 has been successfully paired with the vehicle 199. This allows the passenger 229 to know he has been paired with the vehicle 199 and optionally allows the passenger 229 to refute or confirm the accuracy of the pairing and the linkage.

Upon creating the linkage a bill may be generated and provided to the passenger 229 for a cost of the trip being conducted by the vehicle 199 based upon the pairing information generated by the link manager 420.

Upon creation and use of the linkage, the linkage may also be terminated as follows. First, the vehicle 199 and/or the mobile device 200 may request a link termination from the link broker 426 to terminate the linkage. Then, the link broker 426 terminates the linkage in the current links table 428, including additional information about the termination, such as the time of termination of the linkage, the location of the passenger 229 and the vehicle 199 when the linkage was terminated, and the requester of the termination (i.e. the driver or the passenger 229). Then, the link broker 426 transmits to the non-requesting entity, that is the entity which did not request for the termination (the vehicle 199 or the mobile device 200), or makes available to the non-requesting entity a message that the link between the passenger 229 and the vehicle 199 has been terminated including, preferably, additional information about the termination, such as the reason for the termination, the amount owed for the trip, etc.

With reference to FIG. 2, when a passenger 229 who uses system 400, either for convenience or to receive points via an incentive program, gets into a vehicle 199, such as a taxi, and creates a linkage between the passenger 229 and the vehicle 199 via a mobile app on the mobile device 200, primary content 227 is presented to the passenger 229, preferably via in-vehicle equipment 203, such as PIM 220. In some embodiments, in addition to primary content 227, additional content 228 is presented to the passenger 229, preferably via the passenger 229's mobile device 200.

Preferably, the in-vehicle equipment communicates with the remote server 240 to retrieve content 227 and 228 from the remote server 240 to be presented to the passenger. The content 227 and 228 may be presented exclusively on the passenger 229's mobile device 200, or the primary content 227 may be presented on in-vehicle equipment 203, such as PIM 220, and the additional content 228 may be presented on the passenger 229's mobile device 200.

Preferably, the wireless communication device 241 is used to communicate information between the remote server 240 outside of the vehicle 199 and the in-vehicle equipment 203.

Preferably, the in-vehicle equipment 203 is provided with passenger information 204 and vehicle information 205. In one embodiment, the passenger information 204 is provided to the in-vehicle equipment 203 by the passenger 229, preferably via the passenger's mobile device 200. In one embodiment, the passenger information 204 is automatically generated, preferably by in-vehicle equipment 203 based on information picked up by in-vehicle equipment 203, such as location information, images taken of the passenger or the surroundings, and other such information. The automatically generated passenger information 204 is then provided to the in-vehicle equipment 203. Preferably, the in-vehicle equipment 203 is also provided with vehicle information 205, either via the driver or automatically generated using in-vehicle equipment 203.

In one embodiment, the passenger 229's mobile device 200 communicates with and provides information to the in-vehicle equipment 203 either directly via a pairing procedure in which the mobile device 200 pairs with the in-vehicle equipment 203, or indirectly via remote server 240.

In one embodiment, the passenger information monitor 220 is provided with and sends passenger information 204 along with vehicle information 205 to the remote server 240 via the wireless communication device 241, and the passenger information monitor 220 receives primary content 227 to display on the display 225 in response to the provided passenger information 204. Preferably, the mobile device 200 receives additional content 228 to display on a display 206 of the mobile device 200. Preferably, the additional content 228 is displayed in conjunction with the primary content 227. Preferably, the additional content 228 and/or the primary content 227 is received in response to the provided passenger information 204 and/or vehicle information 205. Preferably, the additional content 228 is related to the primary content 227. Preferably, the additional content 228 is displayed simultaneously with the primary content 227. In this manner, there can be some relationship and some interaction between the primary content 227 and the additional content 228, adding to the passenger 229's experience in the vehicle 199.

The vehicle information 205 is any information regarding the vehicle 199, such as the vehicle 199's unique ID, YIN number, serial number, license plate, registration number, make, model, color, and location. Preferably, the vehicle information 205 includes one of environmental information, location information, route information, time information, and date information.

The passenger information 204 is any information regarding the passenger 229, such as the passenger 229's name, address, telephone number, financial information, physical description, sex, age, job title, profession, likes, dislikes, hobbies, interests, and such.

In one embodiment, the passenger information 204 is linked with the vehicle information 205, preferably via the link manager 420, and used to drive content 227 and 228 to the passenger 229 via the passenger's mobile device 200 and/or in-vehicle equipment 203, preferably using the content manager 450.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a computer readable memory medium such as a magnetic medium like a hard disk drive, and solid state drive magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A system for pairing a passenger having a mobile device with a vehicle, comprising:
   a link manager located remotely from the vehicle and configured to cause a direct exchange between the mobile device and an in-vehicle equipment of the vehicle,
   the in-vehicle equipment being coupled to a remote server, via a network, using a wireless communication device and configured to present content to a passenger's device of the vehicle,
   the in-vehicle equipment further including a storage device or a computer to store the content streamed from the remote server through the wireless communication device;
   vehicle location determining means which generate vehicle location information for the vehicle, including vehicle speed and vehicle travel direction, the vehicle travel direction being based on information provided by a wireless service provider or a Global Positioning System (GPS), or a combination of both;
   vehicle trip status means which generate vehicle trip status information regarding a trip being conducted by the vehicle;
   mobile location determining means which generates mobile location information for the mobile device, including mobile device speed and mobile device travel direction;
   mobile trip status means which generates mobile trip status information regarding a trip being conducted by the mobile device;
   wherein the link manager compares the mobile location information and the mobile trip status information with the vehicle location information and the vehicle trip status information received to pair the mobile device with the vehicle based on proximity.

2. The system of claim 1, wherein the vehicle location information includes first time information for a time of day which the vehicle location information was generated, wherein the mobile location information includes second time information for a time of day which the mobile location information was generated, and wherein the link managers uses the first and second time information to help match the mobile location information with the closest matching vehicle location information received.

3. The system of claim 1, wherein the vehicle location information includes one of geographical coordinates, address information such as a city, state, street or name of a place at which the vehicle is at or near, IP address information for equipment connected with the first wireless communication device which is at or near the vehicle, or defines a geographical area or zone in which the vehicle is located in.

4. The system of claim 1, wherein the vehicle location determining means is external to the vehicle and analyzes signals or information transmitted from the vehicle and the mobile location determining means is external to the mobile device and analyzes signals or information transmitted from the mobile device.

5. The system of claim 1, wherein the vehicle trip status information includes time information for the time of day which the vehicle trip status information was generated.

6. The system of claim 1, wherein the vehicle trip status information includes a direction of the vehicle, a current speed of the vehicle, or any known destination or trajectory of the vehicle.

7. The system of claim 1, wherein the mobile trip status information includes time information for the time of day which the mobile trip status information was generated.

8. The system of claim 1, wherein the mobile trip status information includes a direction of the mobile device, a current speed of the mobile device, or any known destination or trajectory of the mobile device.

9. The system of claim 1, wherein the link manager matches the mobile location information and the mobile trip status information with the closest matching vehicle location information and vehicle trip status information received by matching the direction of the vehicle, current speed of the vehicle, and/or any known destination of the vehicle with the direction of the mobile device, the current speed of the mobile device, and/or any known destination of the mobile device.

10. The system of claim 1, wherein the link manager transmits pairing information indicating what mobile device or passenger is within a certain vehicle.

11. The system of claim 10, wherein the passenger confirms the accuracy of the pairing information.

12. The system of claim 11, wherein the link manager transmits a confirmation of pairing to the mobile device confirming that the mobile device has been successfully paired with the vehicle.

13. A system for pairing a passenger having a mobile device with a vehicle comprising:
    a link manager located remote from the vehicle and configured to cause a direct exchange between the mobile device and an in-vehicle equipment of the vehicle, wherein the link manager receives information from a fleet of vehicles and a plurality of passengers
    the in-vehicle equipment being coupled to a remote server, via a network, using a wireless communication device and configured to present content to a passenger's device of the vehicle,
    the in-vehicle equipment further including a storage device or a computer to store the content streamed from the remote server through the wireless communication device;
    vehicle location determining means which generates vehicle location information and vehicle trip status information for the vehicle, including vehicle speed and vehicle travel direction, the vehicle travel direction being based on information provided by a wireless service provider or a Global Positioning System (GPS), or a combination of both; and
    mobile location determining means which generates mobile location information and mobile trip status information for the mobile device, including mobile device speed and mobile device travel direction, and
    wherein the link manager compares the mobile location information with the vehicle location information received to pair the mobile device with the vehicle based on proximity,
    further wherein the link manager compares the mobile trip status information with the vehicle trip status information received to pair the mobile device with the vehicle based on proximity.

14. The system of claim 13, wherein the vehicle location information includes first time information for a time of day which the vehicle location information was generated, wherein the mobile location information includes second time information for a time of day which the mobile location information was generated, and wherein the link managers uses the first and second time information to help match the mobile location information with the closest matching vehicle location information received.

15. A computer-implemented method for proximity pairing a passenger having a mobile device with a vehicle conducting a trip, the method comprising:
  determining a vehicle location of the vehicle and generating vehicle location information, including vehicle speed and vehicle travel direction, the vehicle including an in-vehicle equipment being coupled to a remote server, via a network, using a wireless communication device and configured to present content to a passenger's device of the vehicle, the in-vehicle equipment further including a storage device or a computer to store the content streamed from the remote server through the wireless communication device;
  determining a mobile location of the mobile device and generating mobile location information, including mobile device speed and mobile device travel direction; and
  generating pairing information using a link manager and pairing the mobile device with the vehicle using the pairing information generated by the link manager, wherein the link manager includes a computer processor which receives the vehicle location information and the mobile location information and pairs the mobile device with the vehicle based upon proximity provided by the vehicle location information and the mobile location information.

16. The method of claim 15 further comprising:
  determining a trip status for the vehicle and generating vehicle trip status information regarding a trip being conducted by the vehicle;
  determining a trip status for the mobile device and generating mobile trip status information regarding a trip being conducted by the mobile device, wherein the computer processor receives the vehicle trip status information and the mobile trip status information and pairs the mobile device with the vehicle based upon the vehicle trip status information and the mobile trip status information.

17. The method of claim 15 further comprising:
  generating a bill to the passenger for a cost of the trip being conducted by the vehicle based upon the pairing information generated by the link manager.

18. The method of claim 15, wherein the link manager receives vehicle location information from a plurality of vehicles, and wherein the link managers matches the mobile location information with the closest matching vehicle location information received.

19. The method of claim 15, wherein the vehicle location information includes first time information for a time of day which the vehicle location information was generated, wherein the mobile location information includes second time information for a time of day which the mobile location information was generated, and wherein the link managers uses the first and second time information to help match the mobile location information with the closest matching vehicle location information received.

20. The method of claim 15, wherein the vehicle location information includes one of geographical coordinates, address information such as a city, state, street or name of a place at which the vehicle is at or near, IP address information for equipment connected with the first wireless communication device which is at or near the vehicle, or defines a geographical area or zone in which the vehicle is located in.

21. The method of claim 15, wherein the vehicle trip status information includes time information for the time of day which the vehicle trip status information was generated.

22. The method of claim 15, wherein the vehicle trip status information includes a direction of the vehicle, a current speed of the vehicle, or any known destination or trajectory of the vehicle.

23. The system of claim 1, wherein the in-vehicle equipment presents content to the passenger, in a manner that can be sensed by the passenger.

24. The system of claim 23, wherein the manner that can be sensed uses speakers which emit sound, lighting elements, displays which transmit light, display images, or vibrational elements which may transmit vibrations.

25. The system of claim 1, wherein the vehicle includes the vehicle location determining means and the vehicle trip status means.

26. The system of claim 1, wherein the vehicle location determining means and the vehicle trip status means are located externally to the vehicle.

27. The system of claim 1, wherein the mobile device includes the mobile location determining means and the mobile trip status means.

28. The system of claim 1, wherein the mobile location determining means and the mobile trip status means are located externally to the mobile device.

29. The system of claim 1, wherein the network includes a data network, a wide area network (WAN), a cable network, a telecommunication network, a satellite communications network, or a cable television network.

* * * * *